(12) United States Patent
Doganata et al.

(10) Patent No.: US 7,757,163 B2
(45) Date of Patent: Jul. 13, 2010

(54) METHOD AND SYSTEM FOR CHARACTERIZING UNKNOWN ANNOTATOR AND ITS TYPE SYSTEM WITH RESPECT TO REFERENCE ANNOTATION TYPES AND ASSOCIATED REFERENCE TAXONOMY NODES

(75) Inventors: Yurdaer N. Doganata, Chestnut Ridge, NY (US); Youssef Drissi, Ossining, NY (US); David A. Ferrucci, Yorktown Heights, NY (US); Tong-Haing Fin, Harrison, NY (US); Genady Grabarnik, Scarsdale, NY (US); Lev Kozakov, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/620,189

(22) Filed: Jan. 5, 2007

(65) Prior Publication Data

US 2008/0168080 A1 Jul. 10, 2008

(51) Int. Cl.
*G06F 17/00* (2006.01)
(52) U.S. Cl. .......................... 715/230; 704/9
(58) Field of Classification Search ................ 707/101, 707/102, 104.1; 704/9; 706/12, 50
See application file for complete search history.

(56) References Cited

U.S. PATENT DOCUMENTS

| | | | | |
|---|---|---|---|---|
| 5,675,710 | A * | 10/1997 | Lewis | 706/12 |
| 6,823,325 | B1 * | 11/2004 | Davies et al. | 706/50 |
| 7,257,774 | B2 * | 8/2007 | Denoue et al. | 715/719 |
| 2002/0142277 | A1 * | 10/2002 | Burstein et al. | 434/335 |
| 2003/0200034 | A1 * | 10/2003 | Fellenberg et al. | 702/20 |
| 2003/0212544 | A1 * | 11/2003 | Acero et al. | 704/9 |
| 2004/0261016 | A1 * | 12/2004 | Glass et al. | 715/512 |
| 2005/0027664 | A1 * | 2/2005 | Johnson et al. | 706/12 |
| 2006/0253274 | A1 * | 11/2006 | Miller | 704/9 |
| 2007/0143101 | A1 * | 6/2007 | Goutte | 704/9 |
| 2007/0150801 | A1 * | 6/2007 | Chidlovskii et al. | 715/512 |

OTHER PUBLICATIONS

Component Services for Knowledge Integration in UIMA (a.k.a. SULKI), IBM Research, UIMA KNowledge Integration (v7), 2005, IBM Corporation, pp. 1-7.

J. William Murdock et al. Obtaining Formal Knowledge from Informal Text Analysis, IBM Research, published in RC23961, 2006, p. 1.

* cited by examiner

*Primary Examiner*—Pierre M Vital
*Assistant Examiner*—Christopher J Raab
(74) *Attorney, Agent, or Firm*—Whitham, Curtis, Christofferson & Cook, P.C.; Stephen C. Kaufman

(57) ABSTRACT

An unknown annotator and its annotation type system are compared against a reference annotation type system. The comparison is done by providing a plurality of documents, and annotating each document using the reference set of document annotators, producing instances of reference annotation types, to generate a pre-annotated reference document set, and using the subject annotator and its subject annotation type system to generate a pre-annotated evaluation document set. Documents in the pre-annotated evaluation document set are compared to documents in the pre-annotated reference document set, and matches in location, within the compared documents, of instances of the subject annotation types and the reference annotation types are identified. Based on the matching data, reference document annotation types are selected that sufficiently correlate with the subject annotation type system. Based on the type system matching, the subject annotator and its type system are associated with a plurality of reference industrial taxonomy nodes.

10 Claims, 4 Drawing Sheets

METHOD AND SYSTEM FOR CHARACTERIZING UNKNOWN ANNOTATOR AND ITS TYPE SYSTEM WITH RESPECT TO REFERENCE ANNOTATION TYPES AND ASSOCIATED REFERENCE TAXONOMY NODES

FIELD OF THE INVENTION

The field of the invention is data processing, more specifically, machine annotation of textual documents and characterizing a given annotator schema with respect to a plurality of other annotator schema.

BACKGROUND OF THE INVENTION

Linguistic Annotations and Annotation Types

Text analysis, or "TA," is understood in the art pertaining to this invention as a sub-area or component of Natural Language Processing or "NLP." TA is important in the application of informational technology, over a range of industries and uses including, for example, information search and retrieval systems, e-commerce and e-learning systems. A typical TA involves an "annotator," which is understood in the relevant art as a process for searching and analyzing text documents using a defined set of tags, and running the annotator on the text document to generate what is known in the art as "linguistic annotations." Annotators and linguistic annotations are well known in the art pertaining to this invention, and many publications are available. For the interested reader, an example listing of such documents is available at the following URL: <http://www.ldc.upenn.edu/>.

In general, linguistic annotations are descriptive or analytic notations applied to raw language data but, for purposes of this description, the meaning will generally encompass any annotation that associates certain regions, or spans, of a document with labels and other metadata. Different labels, created by annotators, may be used to identify different regions of text, and these different labels are associated with the "types" used by the annotators. Hereinafter, unless otherwise stated or made clear from its context, each instance of the term "type" or "types" has the meaning of "type" or "types" commonly understood in the art to which the present invention pertains, including, but not limited to: labels created by annotators used to identify information about or pertaining to different regions of text.

The description of an annotator therefore requires defining its associated "annotation types" which, as known in the art, means an abstract structure representing linguistic annotation data/features and its semantic information labels created by annotators used to identify information pertaining to different regions of text. The information generally includes both semantic information and attributes or features, but does not necessarily follow a common ontology or structure. Example "features" include the text words that start and end, i.e., bracket, the region corresponding to the annotation. Other example features are attributes of the semantic information. For example, in the following annotated text bracketed by "<" and ">": <annot type="Location" kind="city" begin="145" end="153">, the field "kind" is an attribute feature and the fields labeled "begin" and "end" and text region location features. The phrase "semantic information" refers to the meaning, i.e., the semantics, of the annotation. In the previous example, semantic information is included in the value associated with the fields the "type" and "kind" which, in the example, are "location" and "city", respectively.

Since the meaning and practice of annotation type is well known in the art pertaining to this invention, further description is omitted. For the interested reader, though, an example reference is available at the following URL: <http://www.tc-star.org/documents/deliverable/D13_11july05.doc>.

It is also known that an annotation type may have additional features, having a range or set of possible values. This is illustrated by the following example annotated text fragment, using an example format of: <annot type="X">text</annot>, where "X" is any of the example annotation types Person, Organization and Location, "text" is the text that the "X" annotation type characterizes, and <annot type="X"> and </annot> is inserted to delineate the beginning and end of the annotated text:

"The underlying economic fundamentals remain sound as has been pointed out by the Fed," said <annot type="Person"> Alan Gayle</annot>, a managing director of <annot type "Organization"> Trusco Capital Management</annot> in <annot type="Location" kind="city"> Atlanta</annot>, "though fourth-quarter growth may suffer".

In the above example, "Alan Gayle" is an instance of the annotation type Person, "Trusco Capital Management" is an instance of the annotation type Organization and "Atlanta" is an instance of the annotation type Location. The example annotation type Location has an example feature, shown as "kind," with possible values of "city", "state", and the like.

Common Type System and Industrial Taxonomy

NLP architectures such as, for example, the Unstructured Information Management Architecture, or "UIMA," which is available to the open source community on, for example, <SourceForge.net>, can define a hierarchical common type system. This is well known in the art pertaining to the present invention. Further description is therefore omitted. For the interested reader, though, an example reference is T. Götz, et al., *Design and Implementation of the UIMA Common Analysis System*, IBM Systems Journal, Vol. 43, No. 3 (2004), available at http://www.research.ibm.com/journal/sj/433/gotz.html.

Such a common type system contains all available annotation types. The inheritance relations between type objects are represented in a tree structure. A common-type system tree can be initially created by experts, with the objective of covering all possible contexts related to annotation type instances. Some (or all) nodes of the common type system tree may represent concrete annotation types realized by one or more available annotators; other nodes may represent abstract types.

Industrial Taxonomy

An "industrial taxonomy" is known in the relevant art as a taxonomy prepared by experts familiar with the concepts of a particular industry. Examples of and example methods for constructing industrial taxonomies are known in the art, and further detailed description will therefore be omitted. The interested reader, however, can refer to, for example, L. Moulton, *Why do You Need a Taxonomy Anyway? And How to Get Started*, KM Know-how, LWM Technology (June 2003), available at http://www.lwmtechnology.com/publish/print-_ezine/nlp0603.htm; XBRL Taxonomies, available at http://www.xbrl.org/Taxonomies/; and E. S. Anderson, The Tree of Industrial Life: An Approach to the Systematics and Evolution of Industry, draft paper (Nov. 28, 2002) available at http://www.business.aau.dk/evolution/projects/phylo/Phylogenetics3.pdf.

As known in the art of text analysis, the same experts that prepare the industrial taxonomy can also associate specific nodes of the common type system tree with the taxonomy categories. Once this relation is established, any annotator that has associated type(s) in the common type system can be linked to specific industrial taxonomy categories. This association is extremely important for solution developers who build NLP applications for particular industrial domains and need to choose annotators that are useful for analyzing documents in corresponding industrial taxonomy categories.

Problems exist in the related art, though, when using a new or unknown annotator. The terms "new" and "unknown" encompass all of: (i) an annotator that produces annotations of unknown type, i.e., not recognizable by a user, (ii) an annotator for which a user, or software application, does not have enough information to associate annotations produced by the annotator with any pre-existing annotation type or taxonomy category, and (iii) an annotator which uses annotation types without including enough semantic information to let the user, or a software application, recognize it.

The objective of solution developers using annotators is to search, mine, or otherwise analyze documents for objectives such as, for example, identifying business trends and identifying activities potentially criminal or inimical to national security. For this objective, solution developers may use, in some manner, several different annotators on a given domain. Some of these annotators may not be well known and, in such instances, solution developers must use their own judgment to ascertain whether the unknown annotator is relevant for documents in their specific context or industrial domain. For instance, an annotator that finds and labels "weapons of mass destruction" may be relevant for a subject domain of, for example "weapons," but likely not relevant for annotating documents in a domain of, for example, "agricultural machinery."

One known method directed to such a problem is manual mapping of annotation types. Manual mapping, though, relies on a human decision, namely a human constructing a map, based on his or her judgment, from a given new annotation type to one of the nodes in the common annotation type system. Software component frameworks for such manual mapping exist such as, for example, the Knowledge Integration and Transformation Engine, also known by its abbreviation "KITE." For the interested reader, an example of publication further describing KITE can be found at the following URL: http://www.research.ibm.com/UIMA/ UIMA%20Knowledge%20Integration%20Services.pdf. However, even with such component framework tools, manual mapping sometimes requires significant human effort and time. Further, annotator developers do not always provide sufficient description of their component, making the process of evaluating the unknown annotator's relevance to a particular subject area even more difficult.

SUMMARY OF THE INVENTION

It is therefore an object of the invention to provide a method and apparatus for identifying relevant domains and taxonomy categories for unknown annotator, based on analyzing its annotation type in comparison to well-known common annotation types included in the common type system.

An example embodiment includes providing a reference set of document annotators, providing a set of reference annotation type systems, and providing a plurality of documents. Each of the plurality of documents is annotated using at least one of the reference set of document annotators and reference annotation type systems to generate a pre-annotated reference document set, and each of the documents is annotated using the subject annotator and the subject annotation type system to generate a pre-annotated evaluation document set. At least one, and preferably all, of the plurality of documents in the pre-annotated evaluation document set is compared to its corresponding documents in the pre-annotated reference document set, to generate a matching data representing matches in location, within the compared documents, between instances of annotations in the subject annotation type system and instances of annotations in the reference annotation type systems. Then, based on the matching data, a reference document annotation type system is selected that meets a pre-determined correlation criterion with respect to the subject annotation type system.

Another of the described example embodiments includes a feature where the selecting includes a detection of when none of the references annotation type system meets the pre-determined correlation criterion and, in response, generates a data indicative of the failure.

BRIEF DESCRIPTION OF THE DRAWINGS

The foregoing and other features, advantages and subject matter of the present invention will be understood and apparent from the following detailed description, viewed together with the accompanying drawings, in which.

DETAILED DESCRIPTION OF PREFERRED EMBODIMENTS

Figure 1:
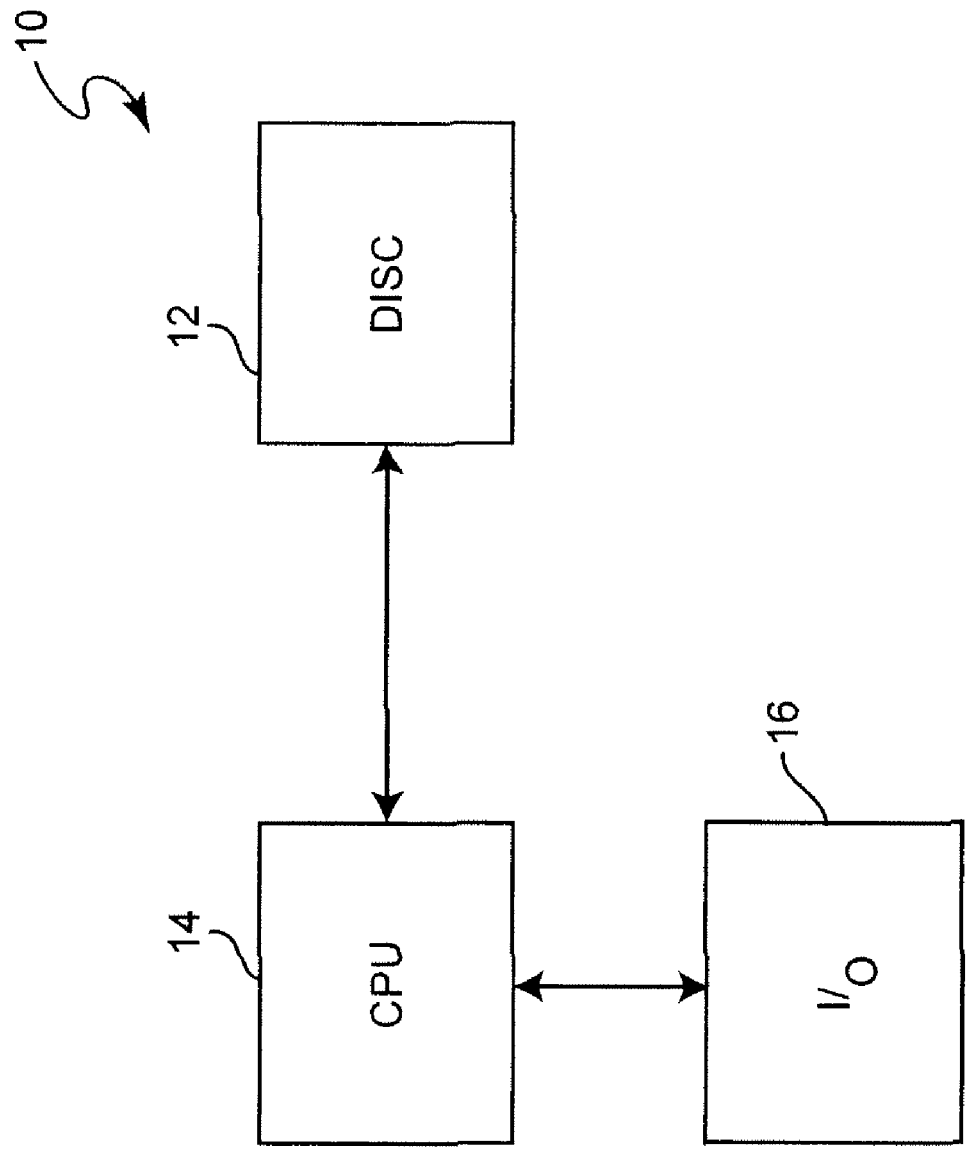
FIG. 1 illustrates an example detailed system architecture in accordance with at least one embodiment.

It is to be understood that the present invention is not limited to the specific examples described herein and/or depicted by the attached drawings, and that other configurations and arrangements embodying or including the present invention can, upon reading this description, be readily implemented by persons skilled in the arts pertaining to the invention.

Further, it is to be understood that, in the drawings, like numerals appearing in different drawings, either of the same or different embodiments of the invention, reference functional or system blocks that are, or may be, identical or substantially identical between the different drawings.

Further, it is to be understood that the various embodiments of the invention, although different, are not necessarily mutually exclusive. For example, a particular feature, function, act, structure, or characteristic described in one embodiment may, within the scope of the invention, be included in other embodiments.

Further, it is to be understood that the terminology used herein is not limiting and, instead, is only for purposes of consistency in this description such as, for example, in referencing example functions, operands, acts, system blocks, and the particular operation of the specific examples that are presented.

Further, it is to be understood, particularly with respect to functional block diagrams, that functions and operations shown as separate blocks are not, unless otherwise specified or clear from the context, performed at separate times, or on separate computational units. Further, functions and operations depicted as multiple blocks may be implemented or modeled as a single block.

Further, as will be understood by persons skilled in the art upon reading this description, certain well-known methods, arrangements, acts and operations of annotators are omitted, or are not described in detail, so as to better focus on, and avoid obscuring the novel features, combinations, and structures of the present invention.

The present invention includes various functional blocks, acts, steps and/or operations (collectively "operations"), which will be described below.

FIG. 1 illustrates one example of a detailed system architecture 10 in accordance with at least one embodiment of the present invention, in which described operations can be embodied in machine-executable instructions stored on, for example, the disk 12 or other machine-readable medium, the instructions causing a general-purpose or special-purpose processor, such as, for example, the central the processing unit, or CPU 14 to perform the operations. The instructions may be stored on, for example, the disk 12 or another other storage medium. The described data, such as the corpus of documents, pre-annotated documents and annotated documents described in reference to FIGS. 2-4, may be stored on, for example, the disk 12 or another machine medium. An I/O unit or system 16 such as, for example, a keyboard and/or graphical user interface or, for example, a personal computer connected via network to the CPU 14 is included in the example system 10.

Alternatively, the described operations may be performed by specific hardware components that contain hardwired logic for performing the steps, or by any combination of programmed computer components and custom hardware components. Further, the described operations may be performed in distributed computing systems or environments, such as processors and processing components remote from a machine-readable medium, where instructions from the medium are communicated over a communication link or network.

The example embodiments include functions of, and generate data for, automatically evaluating unknown annotator types by identifying which from among a plurality of known annotator types matches or aligns closest to the unknown annotator, using the described evaluation methods and selection criteria. Further, based on the selection of which common annotator type system best matches or aligns the unknown annotator, a suitable taxonomy category from among a set of known industry taxonomies is identified.

The description of the example embodiments and of the example operations of these embodiments identify that the corpus document(s), and the set of known annotators and annotator types against which the unknown annotator is evaluated, be selected or configured to have certain characteristics or meet certain design criteria. These preferred characteristics and design criteria are identified herein. It will be understood, though, that these are not, except where specifically stated, pre-requisites in the strict sense for using or implementing the present invention. Instead, except where otherwise expressly stated, it will be understood that the identified preferred characteristics and design criteria are general guidelines for practicing the invention.

b) the corpus document provides complete context for all concrete annotation types in the common type system. Stated differently, the corpus document should be such that each concrete annotation type from the common type system is instantiated on the corpus by applying the appropriate annotator. This characteristic can be presented in the following way: for each annotation type A, the set of instances of annotation type A on the corpus is not equal to zero. The best mode of the invention is that the document corpus is such that this requirement is strictly met. However, it is contemplated that embodiments in which annotation types known in the relevant art as "rear" types may not be needed.

A sub-criterion of the first design criterion is that, preferably, the corpus produces a sufficient amount of different instances of each concrete annotation type included in the set of common annotation types. The number of different instances defining "sufficient amount" is a design choice; a guideline is that the number should be sufficient to apply proper statistical, or probabilistic, methods of analysis and comparison. As known in the relevant art, annotators often make mistakes, so statistical or probabilistic analysis is generally preferable.

The second of the design criteria is that the common set of annotators is such that every concrete annotation type from the common type system is realized by at least one available annotator. This is a prerequisite for an embodiment practicing the best mode of the invention. Stated differently, in the best mode, the common set of annotators is the set of annotators that realize all concrete annotation types in the common type system. Therefore, if, in the selection of the common set of annotators, it is determined that one of the concrete annotation types cannot be instantiated by any annotator, that concrete annotation type must be dropped, or marked "abstract." In other words, the resulting reference type system should not contain concrete types that cannot be instantiated by any existing annotator.

A third of the design criterion is that the examples operate with a complete set of pre-annotated documents, this set also being identified as the "reference documents." As will be described in greater detail below, the reference documents are created by applying the common set of annotators, meeting the first design criteria identified above, to a document corpus meeting the second design criteria identified above. Stated differently, embodiments of the best mode of this invention use, as the reference documents, a set of pre-annotated documents contains all instances of all concrete annotation types from the common type system. The pre-annotation can be in accordance with known annotation methods and, therefore, further detailed description as to how the pre-annotated documents are created is omitted.

A fourth design criterion is that the embodiments employ a common type system taxonomy. The common type system taxonomy is associated with the common type system, and means that each concrete annotation type from the common type system is associated with at least one taxonomy category. This taxonomy criterion is not an absolute pre-requisite, in that the invention can be practiced if one or more of the concrete types is not associated with any taxonomy node, but as one of ordinary skill in the art will understand by reading this disclosure, the final conclusion on the applicability of a subject annotator that realizes that (or those) concrete type(s) will or may not be sufficiently accurate to have useful value.

Figure 2:
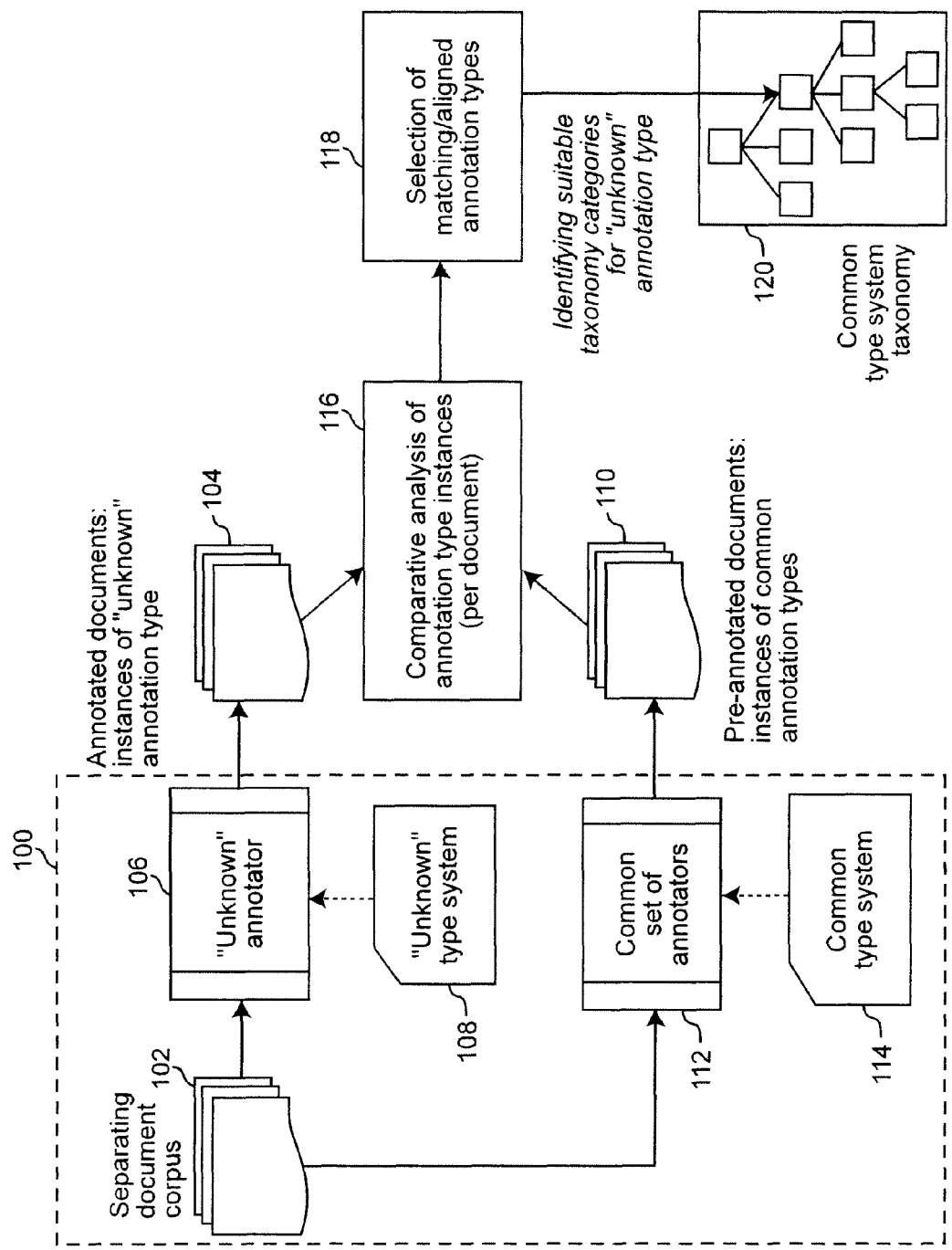
FIG. 2 illustrates an example high level functional diagram of an example annotator characterization system and method according to the present invention.

Referring to FIG. 2, an example general schema according to the present invention will be described. Functional block 100 represents a separating document corpus 102, from which two sets of annotated documents are generated—an evaluation annotated document set 104, consisting of the document corpus 102 annotated by block 106 applying an unknown annotator using an unknown annotator type system 108, and reference document set 110, consisting of the same document corpus 102 annotated at block 112 by a common set of annotators, using their common type system 114.

As stated above, it is assumed that the document corpus 102 is sufficient such that the evaluation document set 104 produces a complete set of instances of the unknown annotation type. It is also assumed that the document corpus 102 provides separation of all possible pairings of concrete annotation types (not separately labeled) in the common type system 114, and that the common set of annotators 112 is sufficient to realize all concrete annotation types in the common type system 114.

With continuing reference to FIG. 2, a comparison, represented by functional block 116, is performed of all instances of the annotation types from unknown annotation type system 108 in the evaluation documents 104 to all instances of the common annotation type system 114 appearing in the reference documents 110. The comparison shown at block 116 is done per document, i.e. instances of the unknown annotation type 108 in each document (not separately labeled) in the evaluation documents 104 are compared to instances of the common annotation types from the common type system 114 in the corresponding document (not separately labeled) from among the reference documents 110. An example embodiment of the comparison 116 described in greater detail in reference to FIG. 3.

Figure 3:
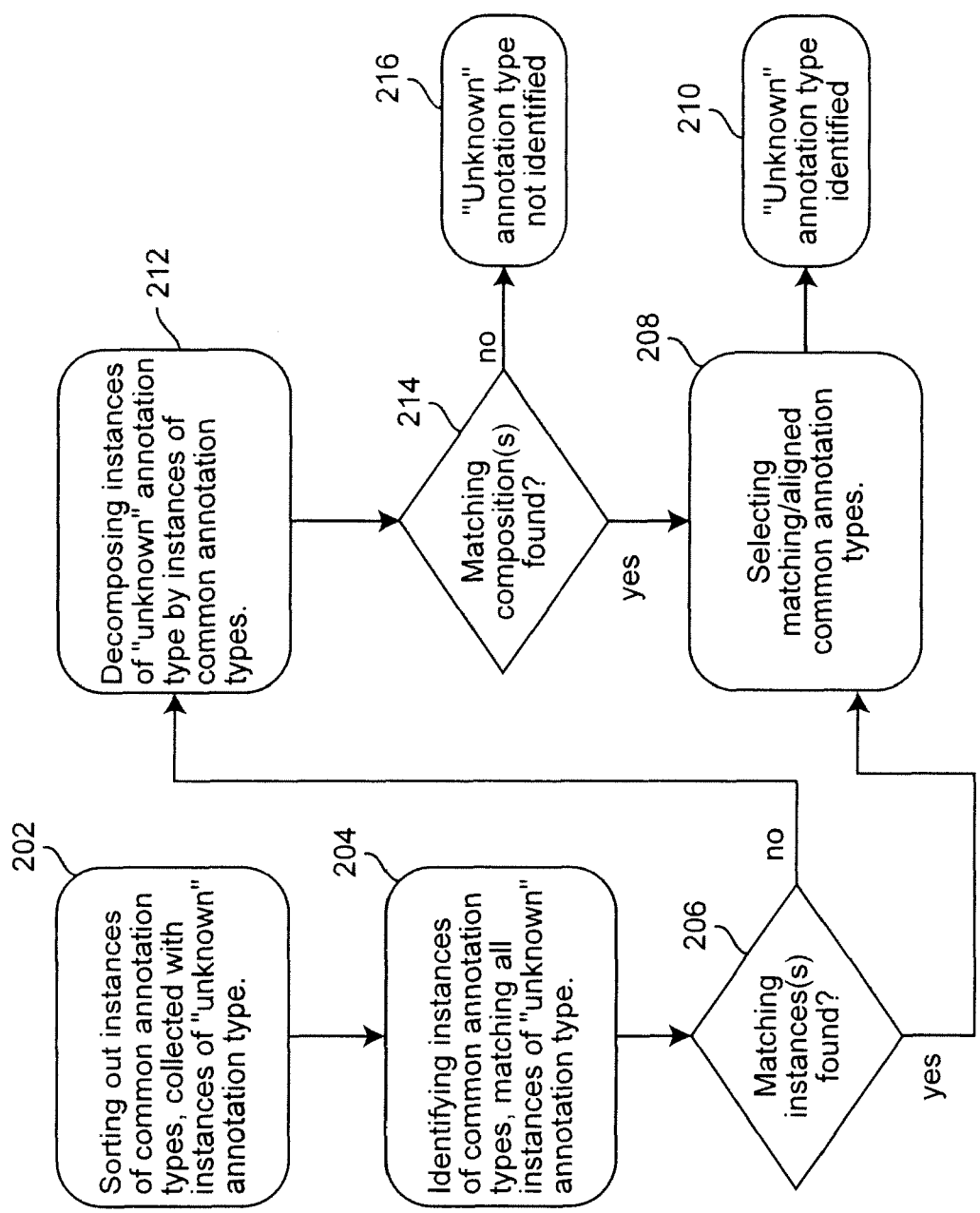
FIG. 3 illustrates an example functional diagram of the FIG. 2 function of comparing a document corpus annotated by an unknown annotator with the same corpus annotated by a common set of annotators and common type system.

Referring to FIGS. 2 and 3, an example embodiment of the FIG. 2 comparison 116 begins, as represented by the FIG. 3 functional block 202, by filtering out instances of the common annotation types from the common type system 114 that are collocated in the reference documents 110 with instances of the unknown annotation type in the corresponding evaluation documents 104. This filtering 202 is preferable, because it allows reduction in the number of instances of the common annotation types used by the FIG. 2 Block 116 comparison process, but may be omitted.

Figure 4:
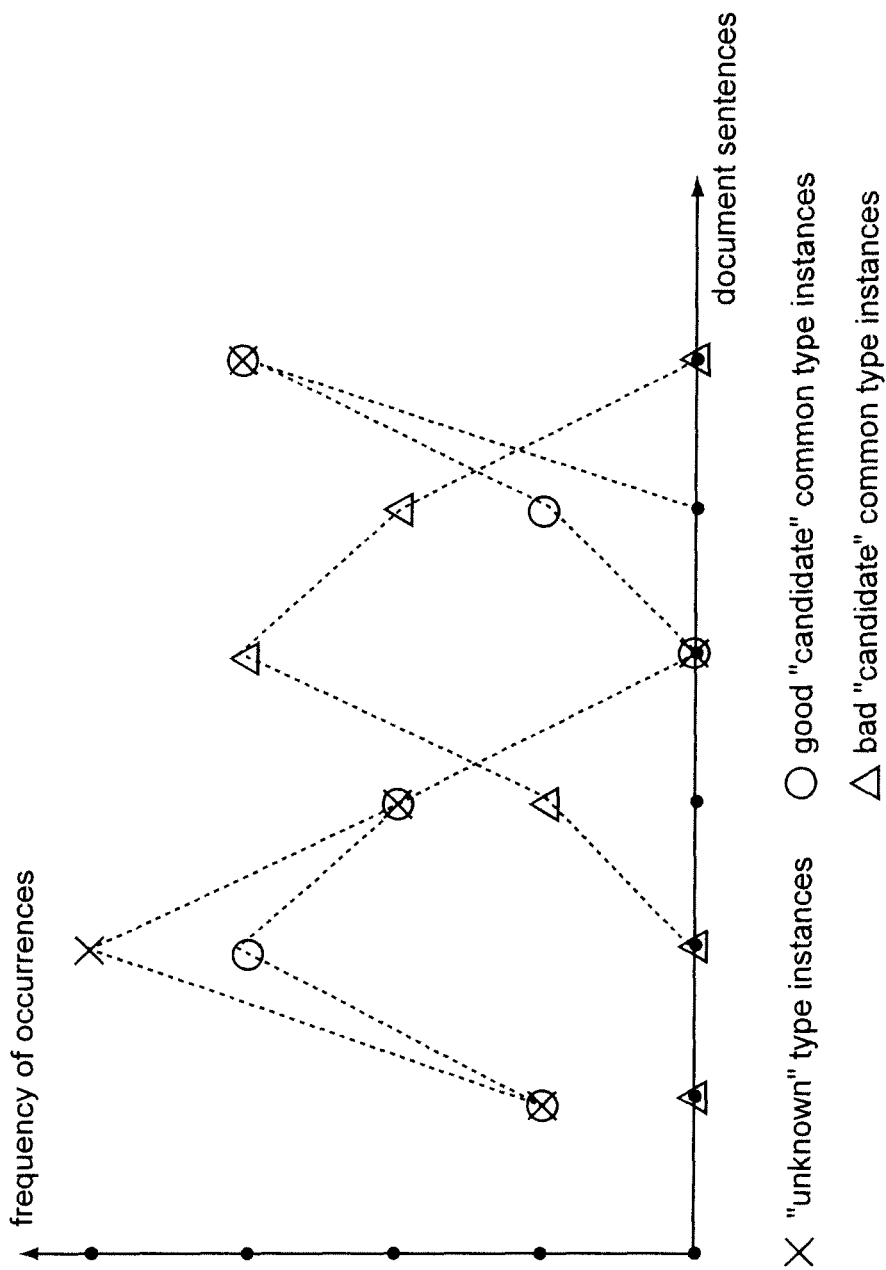
FIG. 4 illustrates, in graph representation form, an example, for a candidate selection in embodiments of the present invention, of coincidences and differences in frequencies of occurrence, comparing example unknown annotation type instances with example good candidate common annotation type instances and example bad candidate common annotation type instances.

An example embodiment of the Block 202 filtering process will be described in reference to FIG. 4. The flow of an example embodiment of the filtering 202 is as follows:

a) a graph, or information that can be described in graph form is constructed or calculated for each concrete common annotation type, for each document in the reference documents 110, representing frequencies of the type instances in each sentence of the document;

b) analogous frequency graphs, or frequency information that can be described in graph form as graphs, are calculated or constructed, for each document in the evaluation documents, for the unknown annotation type; and c) by comparing, on a per document basis, the graphs or information identified at sub-paragraph (a) above, i.e., the common annotator type system frequency graphs, to the graphs or information identified at sub-paragraph (b) above, i.e., the unknown annotator type system frequency graphs, filtering is obtained as to the common type system instances that are co-located with the unknown type system instances.

It will be understood that the above-listed example outline for carrying out the example filtering 202 is only for purposes of presenting an example logical representation, and is not necessarily a representation of a sequence, grouping or modules of operations or machine readable code for the filtering.

After the block 202 filtering is performed, its results are used by block 204 to identify instances of the common annotation types 114 matching instances of the unknown annotation type 108. Because of the block 202 filtering, the block 204 operation relates only to instances of the common annotation types 114 that are collocated with instances of the unknown annotation type 108.

An example embodiment for carrying out the Block 204 operation of identifying matching instances of common annotation types 114 and the unknown annotation types 108 is based on the standard "F-measure," that is known in the art and, therefore, a detailed description is omitted. For convenience to the interested reader, though, an example detailed description of the "F-measure" is in the following reference: C. Manning and H. Schuitze, Foundations of Statistical Natural Language Processing, MIT Press. Cambridge, Mass., p. 269 (May 1999). A specific example for calculating the F-measure is:

$$F(X, Y)=2*P*R/(P+R) \qquad \text{(Equation 1), where}$$

X represents instances of one of the common annotation types,

Y represents instances of the unknown annotation type,

P is a "precision" factor, equal to the number of instances Y matching instances of X, divided by the total number of instances of Y, and R is a "recall" factor, equal to the number of instances Y matching instances X, divided by the total number of instances X.

It will be understood that the above-listed example outline for carrying out the example matching instances 204 is only for purposes of presenting an example logical representation, and is not necessarily a representation of a sequence, grouping or modules of operations or machine readable code for matching.

Referring to FIG. 3, if at least one matching instance is identified by the previously described blocks 202 and 204, the flow, as shown in the conditional flow branch 206, continues to the type selection operation shown as block 208. If blocks 202 and 204 do not identify any matching instances, the flow continues to the decomposing function represented by functional block 212.

With continuing reference to FIG. 3, functional block 212 decomposes instances of the unknown annotation type by instances of the common annotation types by, for example, identifying combinations of instances of the common annotation types that are aligned with each instance of the unknown annotation type in the same location of the corpus document, i.e., same document, same sentence. If a combination of instances of several common annotation types, from the FIG. 2 common type system 112, is aligned, in the FIG. 2 reference documents 110 annotated using the common type system 112, with an instance of the unknown annotation type in the same location in the FIG. 2 evaluation documents 104 annotated using the unknown type system 108, such common annotation types are called "aligned" with the unknown annotation type.

The above-described combination of instances of several common annotation types may be represented as follows: inst_of_unknown_annot_type=inst_of_annot_type_A+inst_of_annot_type_B.

An example of common annotation types being aligned with an unknown annotation type, with "Official_Title" and "Person" being common annotation types in this example, can be represented as follows:

<annot type="Unknown">President George W. Bush</annot>=<annot type="Official_Title">President</annot>+<annot type="Person">George W. Bush</annot>.

As stated above, the function of the Block 212 decomposing is to represent, if possible, instances of unknown annotation type as a combination of instances of the common annotation types. An example embodiment of the FIG. 3 functional Block 212 decomposing instances of the unknown annotation type by instances of the known annotation type is as follows:

a) Compare, on a per-document basis, the pre-annotated evaluation documents 104 with the pre-annotated reference documents 110, by comparing instances based on comparing spans of the annotation types instances in each sentence of a given document; and b) For each pair of documents, i.e., each of the pre-annotated evaluation documents 104 and its corresponding document in the pre-annotated reference documents 11, the result of the comparison may be that $$IT^* = \text{Combination}(\text{document } IT_1, \ldots, IT_n) \quad \text{(Equation No. 2)},$$

where IT* is an instance of the unknown annotation type, and $IT_i$ are instances of the common annotation types.

It will be understood that the above-listed example outline for carrying out the example decomposing 212 is only for purposes of presenting an example logical representation, and is not necessarily a representation of a sequence, grouping or modules of operations or machine readable code for the decomposing.

The following example illustrates this example embodiment of the FIG. 3 Block 212 decomposition procedure:

i) Assume two common annotation types named, for example, T1 (Official_Title) and T2 (Person_Name), and an unknown annotation type labeled, for example, T*.

ii) Assume the following example original sentence:

"The deal appeared to be a clear victory for Sen. John McCain, R-Ariz., who sponsored the proposed ban, and a setback for Vice President Dick Cheney and others who had argued that the ban would hurt U.S. efforts to glean information from detained terrorist suspects."

iii) Consider the example original sentence, annotated at FIG. 2 Block 112 by annotators that implement T1 and T2:

"The deal appeared to be a clear victory for <annot type="Official_Title">Sen.</annot> <annot type="Person_Name">John McCain</annot>, R-Ariz., who sponsored the proposed ban, and a setback for <annot type="Official_Title">Vice President</annot> <annot type="Person_Name">Dick Cheney</annot> and others who had argued that the ban would hurt U.S. efforts to glean information from detained terrorist suspects.

iv) Consider the same original sentence, annotated at FIG. 2 Block 106 by the unknown annotator that implements unknown annotation type T*:

"The deal appeared to be a clear victory for <annot type="T*">Sen. John McCain</annot>, R-Ariz., who sponsored the proposed ban, and a setback for <annot type="T*">Vice President Dick Cheney</annot> and others who had argued that the ban would hurt U.S. efforts to glean information from detained terrorist suspects."

v) Decomposing IT* by $IT_1$ and $IT_2$ obtains the following expression:

$$IT^* = IT_1 + IT_2. \quad \text{(Equation No. 3)}$$

If the example Block 212 decomposition process finds one or more suitable, i.e., aligned, combinations of the common annotation types, the flow continues, as shown by conditional branch 214 of the FIG. 3 example block diagram, to the type selection operation shown as Block 208; otherwise it goes to a termination point, represented in the FIG. 3 example block diagram as Block 216, indicating that the unknown annotation type can not be identified in relation to any annotation type from the FIG. 2 common type system 114.

Referring to FIG. 3, an example embodiment for selecting common annotation types matching the unknown annotation type or aligned with the unknown annotation type, represented as Block 208, will be described. Block 208 of FIG. 3 corresponds to Block 118 of FIG. 2, so the example embodiment of Block 208 is also an example of FIG. 2 Block 118. As shown in the example FIG. 2 block diagram, the selecting performed by Block 208 analyzes either the results of the Blocks 202 and 204, i.e., matching types, or the results of Block 214, i.e., aligned types. The goal of Block 208 is to select matching and/or aligned common annotation types that can be reasonably associated with the unknown annotation type in the given context on the given document corpus.

Block 208 filters out accidental matches by applying statistical or other rules. The specific statistical rules, or other rules, are a design choice, readily determined by a person of ordinary skill in the art viewing this disclosure. An example statistical rule is that the instances of two types would be identified as matched if they aligned on at least 50% of the documents from a given corpus. An example of "other rule is to drop all matches found in sentences shorter than, for example, three words. The statistical or other rules may be domain-specific or collection-specific.

After Block 208 selects suitable common annotation type (s), that identification being represented by Block 210 of the FIG. 3 example block diagram, the flow continues to the FIG. 2 Block 120 operation of identifying suitable, i.e., most relevant taxonomy categories.

An example embodiment of the FIG. 2 functional Block 120 finds taxonomy node(s), associated with the matching common annotation type or elements of the combinations identified by the FIG. 3 example functional Block 208. The process performed by Block 120 can be further illustrated by reference to the above example operation of functional Block 212, which used an example two common annotation types of T1 (Official_Title) and T2 (Person_Name). Consider the following fragment of an example taxonomy tree, associated with these example common annotation types T1 and T2:

Humans->Persons->Employees->Officials.

The annotation type T1 is associated with the node "Officials", while the annotation type T2 is associated with the node "Persons". Since, as described above with respect to FIG. 3 Block 212, the annotation type T* is represented as a "union" of T1 and T2, this annotation type is associated with the same taxonomy tree branch as T1 and T2.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. A computer-implemented method for selecting types from a common annotation type system to identify a subject annotation type system, the computer performing the steps of:

providing a reference set of document annotators, said reference set using the common annotation type system;

providing a document corpus comprising a plurality of documents stored on a machine-readable medium;

annotating one or more of said plurality of documents using at least one of said reference set of document annotators to generate a pre-annotated reference document set;

annotating said one or more of said plurality of documents using the subject annotator to generate an evaluation annotated document set, each document in said evaluation annotated document set corresponding to a document in said one or more of said plurality of documents;

comparing, using one or more processors, at least one of said documents in said evaluation annotated document set to its corresponding documents in said pre-annotated reference document set, to generate a matching data representing matches in location, within said compared documents, between instances of annotations using the subject annotation type system and instances of annotations using the common annotation type system;

selecting, using said one or more processors, based on said matching data, a reference document annotation type system, comprised of one or more types from said common annotation type system, that meets a pre-determined correlation criterion with respect to said subject annotation type system; and identifying a taxonomy category for at least one annotation type in said reference annotation type system from among a set of known industry taxonomies.

2. The method of claim 1, wherein said identifying step further comprises:

providing at least one reference taxonomy associated with at least one annotation type in said common annotation type system; and generating a taxonomy for said subject annotator based, at least in part, on said selecting a reference annotation type system and said reference taxonomy.

3. The method of claim 1, wherein said reference annotators, said common annotation type system and plurality of documents are such that less than a predetermined number of possible pairs from among said reference annotators annotate any of said plurality of documents in manner that all instances of annotations from one of said pairs is identical, in type and location, with all instances of annotations from the other of said pairs.

4. The method of claim 3, wherein said pre-determined number of pairs is zero.

5. The method of claim 1, wherein said selecting includes detecting whether none of said reference document annotation type systems meets said pre-determined correlation criterion and, in response to said detecting, generates a data indicating a match failure.

6. A system for characterizing a subject annotator according to a reference annotation type system, comprising:

a machine-readable storage medium;

a machine-readable code, stored on said machine-readable storage medium, having instructions for the machine to apply a plurality of document annotators using a common annotation type system, stored on said machine-readable storage medium;

providing a machine-readable plurality of documents, stored on said machine-readable storage medium;

a machine-readable code, stored on said machine-readable storage medium, having instructions for annotating each of said plurality of documents using at least one of said document annotators to generate a pre-annotated reference document set;

a machine-readable code, stored on said machine-readable storage medium, having instructions for annotating said plurality of documents using said subject annotator to generate an evaluation annotated document set;

a machine-readable code, stored on said machine-readable storage medium, having instructions for comparing at least one of said documents in said evaluation annotated document set to its corresponding documents in said pre-annotated reference document set, to generate a matching data representing matches in location, within said compared documents, between instances of annotations using the subject annotation type system and instances of annotations using the common annotation type system;

a machine-readable code, stored on said machine-readable storage medium, having instructions for selecting, based on said matching data, a reference document annotation type system, comprised of one or more types from said common annotation type system, that meets a pre-determined correlation criterion with respect to said subject annotation type system; and a machine-readable code, stored on said machine-readable storage medium, having instructions for identifying a taxonomy category for at least one annotation type in said reference annotation type system from among a set of known industry taxonomies.

7. The system of claim 6, wherein said machine-readable code for identifying further comprises:

a machine-readable at least one reference taxonomy associated with at least one annotation type in said common annotation type system, stored on said machine-readable storage medium; and a machine-readable code, stored on said machine-readable storage medium, having instructions for generating a taxonomy for said subject annotator based, at least in part, on said selecting a reference annotation type system and said reference taxonomy.

8. The system of claim 6, wherein said reference annotators, said common annotation type system and plurality of documents are such that less than a predetermined number of possible pairs from among said reference annotators annotate any of said plurality of documents in a manner that all instances of annotations from one of said pairs is identical, in type and location, with all instances of annotations from the other of said pairs.

9. The system of claim 8, wherein said pre-determined number of pairs is zero.

10. The system of claim 6, wherein said instruction for selecting include instructions for detecting whether none of said reference document annotation type systems meets said pre-determined correlation criterion and, in response to said detecting, generating a data indicating a match failure.

* * * * *